(12) United States Patent
Rüsing

(10) Patent No.: US 10,612,644 B2
(45) Date of Patent: Apr. 7, 2020

(54) COMPACT ELECTRIC LINEAR DRIVE FOR A GEAR RACK, IN PARTICULAR A HYDRAULIC VALVE, AND METHOD FOR MOUNTING THE SAME

(71) Applicant: HANZA GMBH, Remscheid (DE)

(72) Inventor: Frank Rüsing, Radevormwald (DE)

(73) Assignee: RITTER ELEKTRONIK GMBH, Remscheid (DE)

( * ) Notice: Subject to any disclaimer, the term of this patent is extended or adjusted under 35 U.S.C. 154(b) by 0 days.

(21) Appl. No.: 15/746,172

(22) PCT Filed: Jun. 20, 2016

(86) PCT No.: PCT/EP2016/064205
§ 371 (c)(1),
(2) Date: Jan. 19, 2018

(87) PCT Pub. No.: WO2017/012807
PCT Pub. Date: Jan. 26, 2017

(65) Prior Publication Data
US 2018/0209532 A1    Jul. 26, 2018

(30) Foreign Application Priority Data
Jul. 22, 2015  (EP) ..................................... 15177847

(51) Int. Cl.
  *F16K 31/54*    (2006.01)
  *F16H 57/023*   (2012.01)
  (Continued)

(52) U.S. Cl.
  CPC ........... *F16H 57/023* (2013.01); *F16H 19/04* (2013.01); *F16H 57/02* (2013.01); *F16H 57/025* (2013.01);
  (Continued)

(58) Field of Classification Search
  CPC ...... F16K 31/04; F16K 31/041; F16K 31/042; F16K 31/043; F16K 31/046;
  (Continued)

(56) References Cited

U.S. PATENT DOCUMENTS 3,992,956 A    11/1976   Fischer
4,759,386 A *  7/1988   Grouw, III ............... F16K 31/05
                                                        137/554

(Continued)

FOREIGN PATENT DOCUMENTS

DE    29513701 U1   9/1996
EP    3078792      10/2016

*Primary Examiner* — Matthew W Jellett
(74) *Attorney, Agent, or Firm* — BainwoodHuang

(57) ABSTRACT

An electric linear drive for a gear rack, includes a stepping motor, a holding plate, a motor output gear, and a gearbox. The holding plate, the stepping motor, and the gearbox form a drive unit which, together with a basic housing, form an overall housing. The overall housing has an opening for the insertion of the gear rack. In addition, drive electronics are preferably fixed to the holding plate, in particular integrated in the latter, specifically such that electrical connections are present on the outside of the overall housing. In addition, the stepping motor preferably has a rotor axis which is arranged parallel to the holding plate. Only a few steps are required during assembly. A rack belonging to a device to be driven can be pushed into a lateral opening of the overall housing, and the device to be driven can be connected to the overall housing.

16 Claims, 7 Drawing Sheets

Figure 1:
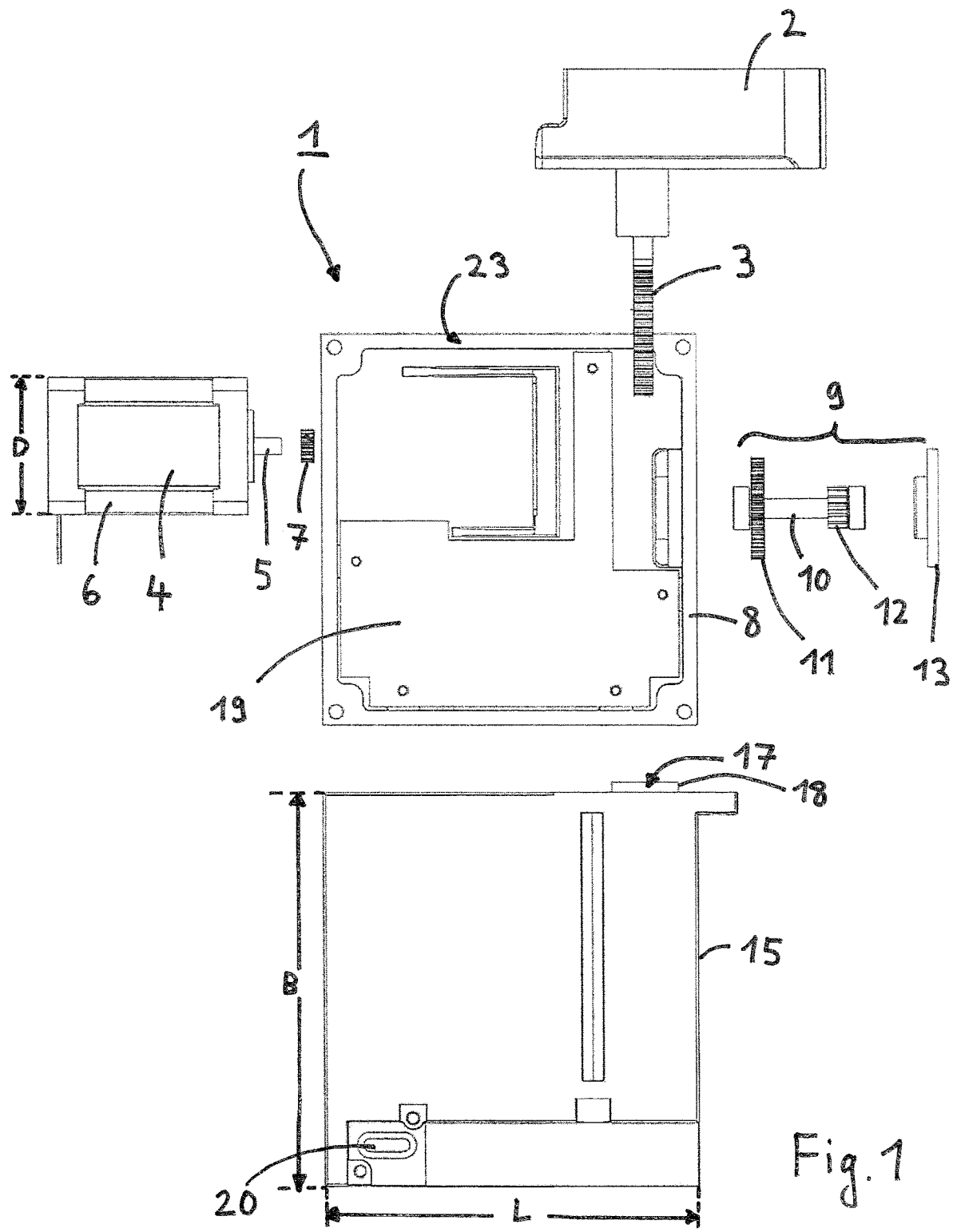

(51) Int. Cl.
*F16H 19/04* (2006.01)
*F16H 57/02* (2012.01)
*F16K 31/04* (2006.01)
*F16H 57/025* (2012.01)
*F16H 57/029* (2012.01)
*F16H 57/031* (2012.01)
*F15B 13/04* (2006.01)
*F15B 13/044* (2006.01)

(52) U.S. Cl.
CPC ......... *F16H 57/029* (2013.01); *F16H 57/031* (2013.01); *F16K 31/04* (2013.01); *F16K 31/041* (2013.01); *F16K 31/042* (2013.01); *F16K 31/043* (2013.01); *F16K 31/046* (2013.01); *F16K 31/047* (2013.01); *F16K 31/54* (2013.01); *F15B 13/0402* (2013.01); *F15B 13/0444* (2013.01); *F16H 2057/02034* (2013.01); *F16H 2057/02086* (2013.01)

(58) Field of Classification Search
CPC .... F16K 31/054; F16K 31/54; F15B 13/0402; F15B 13/0444; F16H 19/04; F16H 57/02; F16H 57/023; F16H 57/031; F16H 57/029; F16H 57/025; F16H 2057/02086; F16H 2057/02034
See application file for complete search history.

(56) References Cited

U.S. PATENT DOCUMENTS

| | | | |
|---|---|---|---|
| 4,836,497 A * | 6/1989 | Beeson | F16K 31/04 |
| | | | 137/315.03 |
| 7,591,448 B2 * | 9/2009 | Martin | F15B 13/0402 |
| | | | 137/884 |
| 8,118,276 B2 * | 2/2012 | Sanders | G05B 19/39 |
| | | | 137/554 |
| 10,239,508 B2 * | 3/2019 | Han | F04B 17/03 |
| 2004/0134665 A1 * | 7/2004 | Greeb | E21B 34/02 |
| | | | 166/379 |
| 2008/0121828 A1 | 5/2008 | Martin et al. | |
| 2008/0121830 A1 | 5/2008 | Martin et al. | |
| 2018/0087544 A1 * | 3/2018 | Magaribuchi | F15B 15/065 |

* cited by examiner

COMPACT ELECTRIC LINEAR DRIVE FOR A GEAR RACK, IN PARTICULAR A HYDRAULIC VALVE, AND METHOD FOR MOUNTING THE SAME

The present invention relates to an electric linear drive for a gear rack of a device to be driven. A typical example of such a driving task is described in US 2008/0121830 A1. There, a plurality of hydraulic valves that are close together are to be actuated by means of gear racks, for which purpose there are corresponding flat, disc-shaped drives, each respectively having a flat stepping motor.

The present invention proceeds from this prior art. An object is to create a compact drive that is suitable for the task described in US 2008/0121830 A1, but also for other tasks. In particular, individualization for only one driving task is to be avoided, such that different devices can be driven. Moreover, it is intended to create a simply constructed, robust and easily mounted electric linear drive that can easily be connected as a unit to a device to be driven and to an electrical supply and control system.

These objects are achieved by an electric linear drive as disclosed herein. An advantageous method for mounting the same is disclosed herein. Advantageous developments, which may be applied singly and in technically appropriate combinations with one another, are disclosed herein.

An electric linear drive according to the invention for a gear rack comprises the following components:
  a stepping motor,
  a holding plate,
  a motor output gear wheel, and
  a gearing,
wherein the holding plate, the stepping motor with the motor output gear wheel and the gearing form a drive unit which, together with a basic housing, forms an overall housing, and wherein the overall housing has an opening for inserting the gear rack. In this way, a linear drive is produced that is easily preassembled and that only after having been assembled can be connected to a device to be driven. Therein, the holding plate simultaneously forms a fastening structure for various components and for a part of the overall housing, as a result of which the number of components and the assembling are simplified. This concept allows a gear rack to be driven subsequently to be guided or carried only in the device to be driven, such that it can be inserted freely into the overall housing. It is, however, also possible to provide a counter-bearing for the gear rack in the overall housing.

In a preferred embodiment, there are additionally drive electronics fastened to the holding plate, in particular integrated into the latter, specifically such that electrical connections are arranged on the outside of the overall housing (16). The electrical connections serve to supply voltage and to connect to a control system, the communication with the control system preferably being realized by means of a bus system. In this embodiment the overall housing thus also contains the electronics required for the operation of the stepping motor, if appropriate including monitoring and safety functions.

In the case of a further preferred embodiment, the stepping motor has a rotor axle that is arranged parallel to the holding plate and perpendicularly to the gear rack to be driven. This arrangement differs from the known prior art of very flat linear drives in that the rotor axle does not lie in the direction of the least extent of the overall housing, but perpendicularly thereto. In the case of flat linear drives, such an arrangement was not really considered, because it was believed that the torques required for many applications could not be applied by stepping motors having small diameters. Unexpectedly, however, a torque that is adequate for most applications, and at the same time a high positioning accuracy, can be generated even with a stepping motor having a small diameter, and for this a greater axial length in combination with a gearing. Moreover, in the plane of the holding plate, additional free space is also created in which, besides a gearing, drive electronics can also be fully accommodated.

Preferably, the linear drive according to the invention has a gearing having at least one gear shaft and having two gear wheels as well as a bearing arrangement, preferably in the form of a counter-bearing plate. The gear axle in this case may be arranged in a direction parallel to the rotor axle of the stepping motor, one of the gear wheels of the gearing meshing with the motor output gear wheel, while another can be brought into engagement with a gear rack, to be inserted subsequently, of a device to be driven. As far as the spatial conditions allow, the transmission ratio of the gearing may be adapted to the desired application.

In the case of a further preferred embodiment of the linear drive according to the invention, the basic housing is configured in the shape of a barrel, and has a joint, extending substantially in one plane, preferably having a joint sealing, to the drive unit configured in the form of a cover to the barrel-shaped basic housing. In the case of typical housings for linear drives, the components are mounted in a barrel-shaped housing, and it is also often even the case that the device to be driven must be mounted before the housing can be closed with the cover. According to the present invention, the basic housing forms an empty volume into which components, fastened to the holding plate, can be inserted when the holding plate, which simultaneously forms, as it were, the cover for the basic housing, is put on. This structure has various advantageous in mounting and in the number of parts and steps that are required. Moreover, a joint that extends substantially in one plane can thus be formed with a level sealing, while an opening in the basic housing that is entirely independent of this joint can be provided for the subsequent connection of a device to be driven, if appropriate having its own sealing.

Preferably, for this purpose the barrel-shaped basic housing has a lateral opening for inserting the gear rack of a device to be driven, and a centering means for centering the linear drive in relation to the gear rack or the device to be driven by the gear rack. This structure allows the linear drive according to the invention to be assembled in a rapid and exact manner with a device to be driven. This feature is advantageous, in particular, in the case of application for driving hydraulic valves arranged closely together, since in the case of such an arrangement individual linear drives can be exchanged without removing the adjacent drives, in that they are easily drawn from the gear rack, in the direction of the gear rack.

If necessary, the gear rack may also be pressed by a counter-bearing against the final gear wheel of the transmission, this being advantageous, in particular, if the gear rack has at least one joint on the input side. Such an arrangement with a jointed gear rack is more easily mounted, and allows certain deviations in the mutual alignment of a linear drive and a device to be driven.

The fastening between the linear drive and a device to be driven is preferably effected by a flange on the basic housing, preferably having a flange seal, the gear rack being inserted into the inside of the overall housing and being brought into engagement with the final gear wheel of the gearing (but not necessarily mounted in the overall housing).

The structure of the linear drive according to the invention renders possible very compact dimensions, wherein the overall housing may be of a flat configuration having a height:length:width ratio of approximately 50:130:130, preferably having absolute dimensions of less than 50 mm in height, less than 130 mm in length and less than 130 mm in width. The overall housing therefore has an almost square shape in one plane and, perpendicularly thereto, a relatively small height, this facilitating the slice-type arrangement for driving a plurality of devices arranged next to each other.

As already mentioned above, a stepping motor is preferably used, having an external stator that has a greatest diameter of less than 45 mm and that is arranged in a decentralized manner on the holding plate, such that drive electronics can still be arranged next to it. This makes particularly good use of the space available in the case of typical dimensions for linear drives of this type.

The invention also relates to a method for mounting a linear drive as disclosed herein. In accordance with certain embodiments, the method comprises the following steps:
- a stepping motor having a motor output gear wheel is fastened to a holding plate,
- a gearing is fastened to the stepping motor and the holding plate,
- a drive unit being produced thus is assembled with a basic housing to form an overall housing, such that the stepping motor and the gearing are located in the overall housing.

Only few steps are required in this type of assembling, because the holding plate not only carries individual components, but at the same time forms a part of the overall housing.

The concept of the invention is particularly advantageous if, prior to the assembling of the overall housing, drive electronics are also fastened to the holding plate or integrated into the latter, such that, following the assembling, electrical connections lie on the outside of the overall housing. There is thus produced, with few mounting steps, a finished compact linear drive, including its drive electronics, which only has to be subsequently connected to a device to be driven, and to a voltage supply and a control device. This happens following the assembling of the overall housing, in that a gear rack belonging to the device to be driven is pushed into a lateral opening of the overall housing, and the device to be driven is connected to the overall housing. A suitable centering means and, if appropriate, a flange sealing, thereby ensure a correct and stable connection.

The invention offers particular advantages if a plurality of linear drives are connected in succession to devices to be driven, in particular hydraulic valves, that are located adjacently, or even close, to each other, such that the linear drives are positioned next to each other in a slice-type manner.

Further details and exemplary embodiment of the invention are explained in greater detail on the basis of the drawing, the components described singly or in particular combinations also being able to be used in other technically appropriate combinations.

Figure 2:
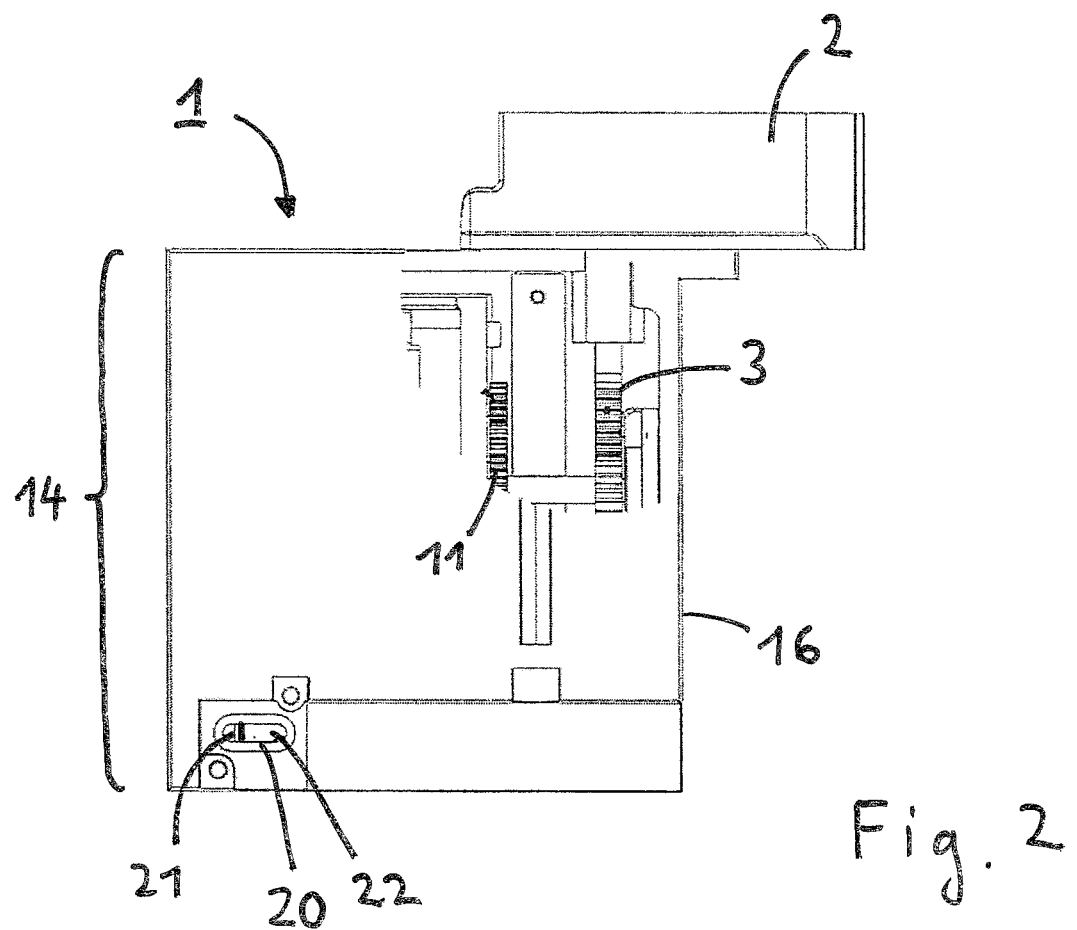
Figure 3:
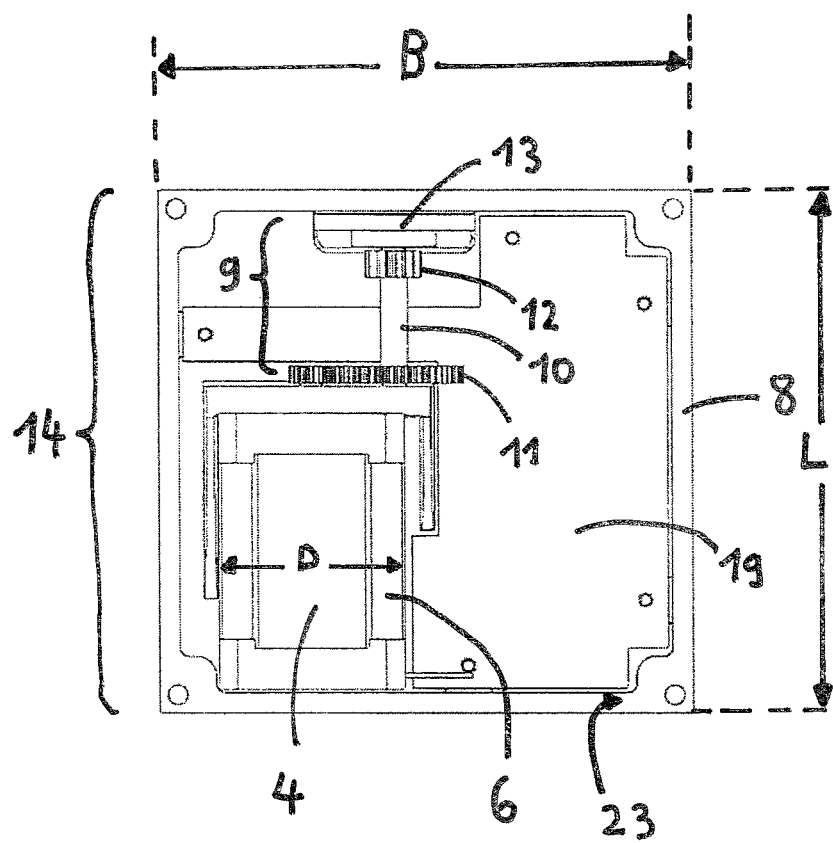
Figure 4:
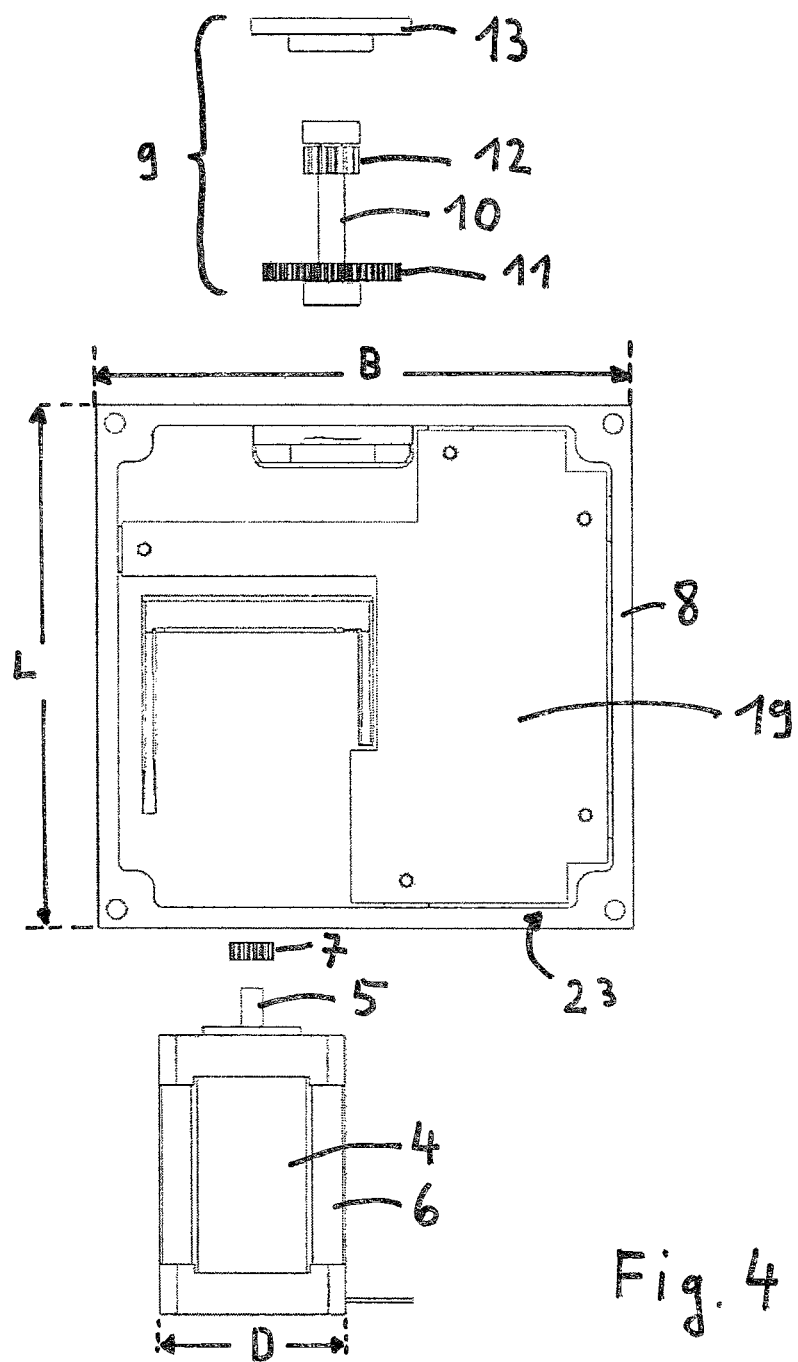
Figure 5:
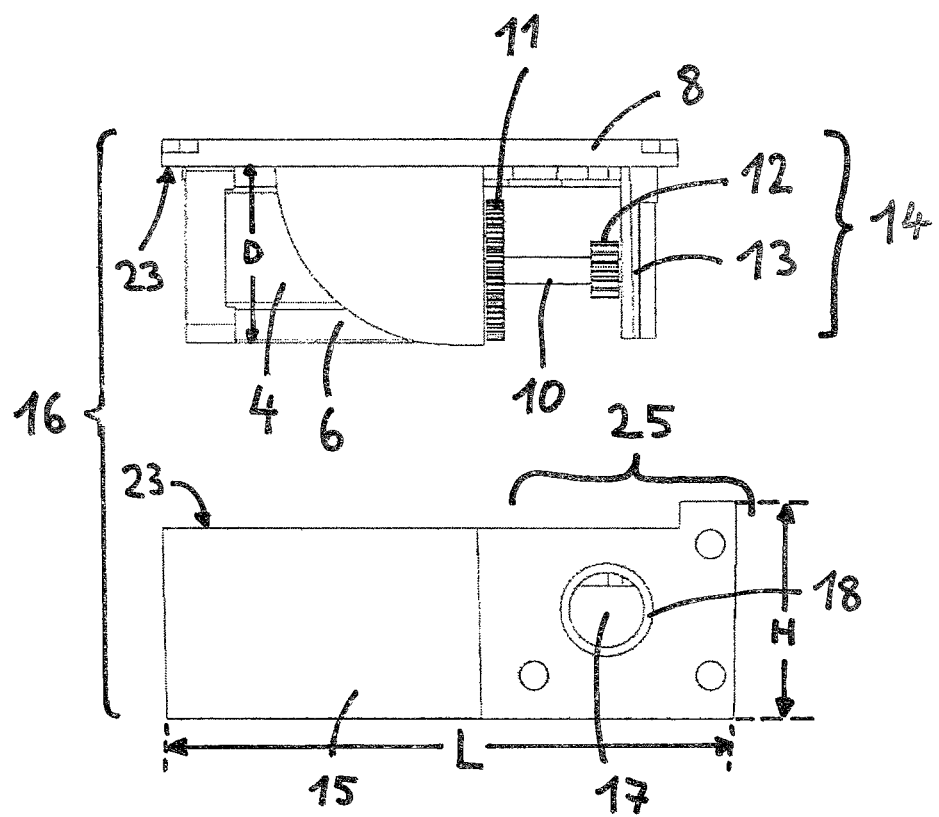
Figure 6:
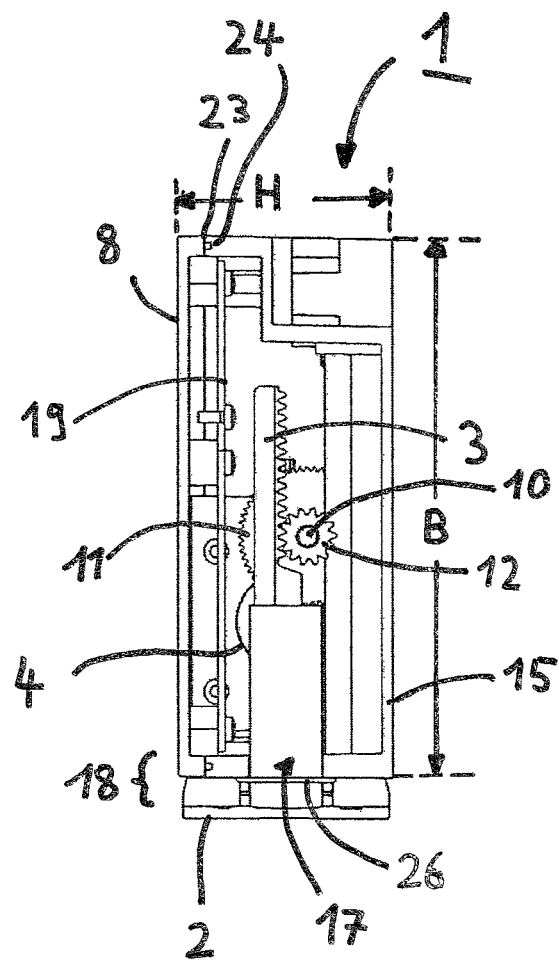
Figure 7:
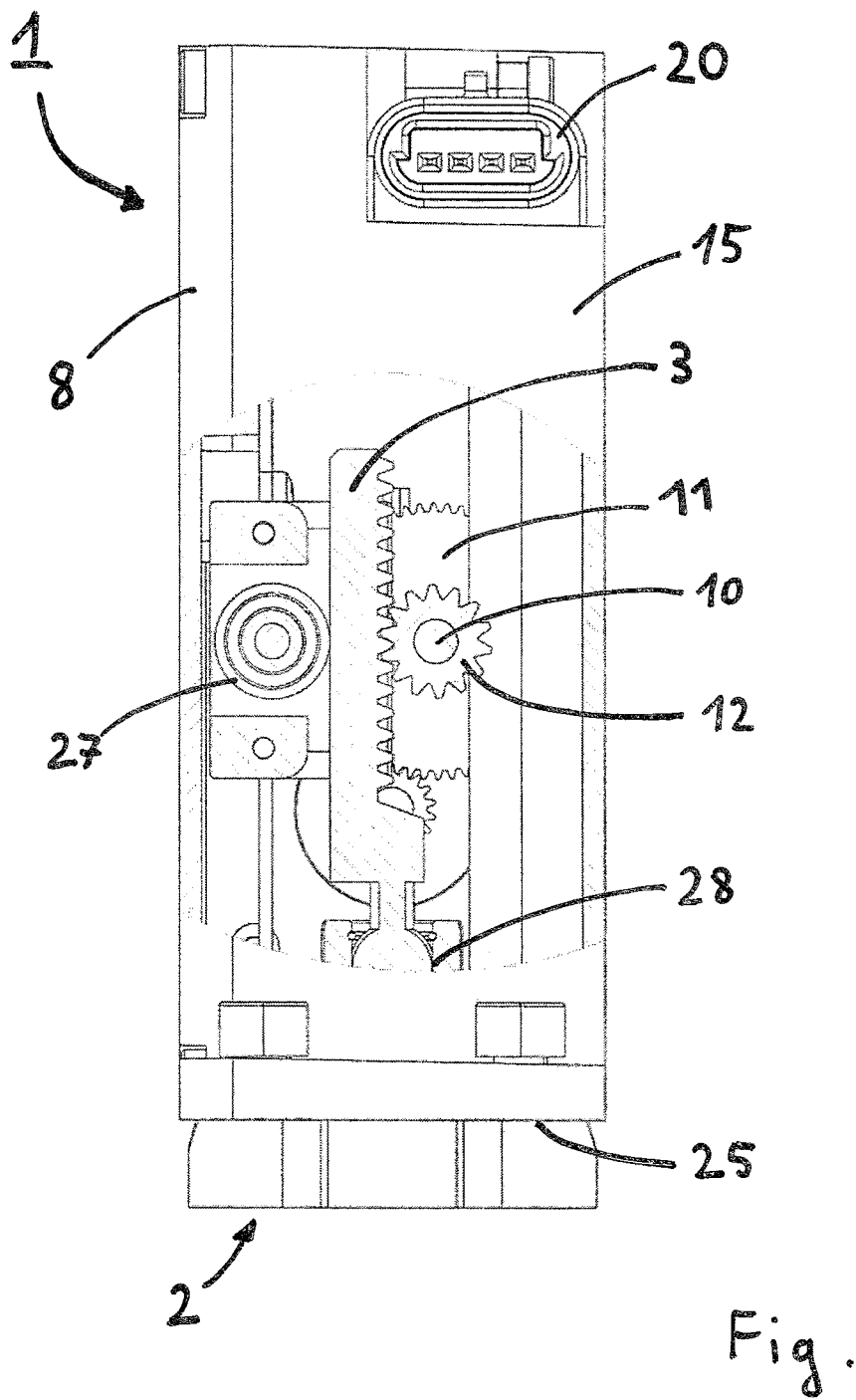

In the figures:

FIG. 1 shows a schematic exploded diagram of the components of an exemplary embodiment of a linear drive according to the invention, prior to assembling, FIG. 2 shows a partially sectional view from above of a linear drive according to the invention, with a device to be driven, FIG. 3 shows a cross section through the arrangement according to FIG. 1 inside the overall housing, with a view of the components arranged therein, FIG. 4 shows mechanical components of a drive unit, in a schematic view, prior to assembling, FIG. 5 shows a lateral view of the basic housing and mounted drive unit, prior to them being assembled, FIG. 6 shows a finished, mounted drive unit, in a schematic, lateral, partially sectional view, and FIG. 7 shows a further exemplary embodiment of a finished, mounted drive unit, in a schematic, partially sectional view, with a gear rack that is guided by a counter-bearing and provided with joint.

FIG. 1, in the form of an exploded diagram, shows the essential parts of the linear drive 1 according to the invention for a gear rack 3 and its action in combination with a device 2 to be driven, from which the gear rack 3 projects. The designations of the individual parts are retained in all figures. A stepping motor 4 having a stator 6, a rotor axle 5 and a motor output gear wheel 7, to be fastened thereto, can be fastened to a holding plate 8. Likewise, a gearing 9, which has a gear shaft 1 having a first gear wheel 11 and a second gear wheel 12 fastened thereto, can be attached to the holding plate 8. The gear shaft is mounted between the stepping motor 4 and a counter-bearing plate 13. Drive electronics 19 are additionally attached to the holding plate 8 or even integrated into the holding plate 8 (the holding plate 8 and the drive electronics 19 form a mechanical unit), specifically such that subsequently electrical connections 20 are arranged on the outside of an overall housing 16 that is produced following the assembling of the holding plate 8 and a basic housing 15. As far as the connections 20 are arranged on the outside of the basic housing 15, a suitable connection, not represented separately here, must be made between the drive electronics 19 and connections 20, this being achievable by usual techniques such as cables with plug-in connections, soldered connections and the like, prior to assembling. Clearly, in the case of data lines, a connection that can be operated with as little interference as possible should be provided. The holding plate 8, together with the stepping motor 4, the gearing 9 and the drive electronics 19, forms a very compact drive unit 14, which can be inserted into the barrel-shaped basic housing 15, the holding plate 8 forming a kind of flat cover that realizes a level joint 23 with the basic housing 15. During assembling, a joint sealing 24, not represented, can be introduced into this level joint 23, for the purpose of tightly sealing the overall housing 16, composed of the basic housing 15 and the holding plate 8. The basic housing 15 has a lateral opening 17, through which the gear rack 3 of the device 2 to be driven is inserted into the inside of the overall housing 16 and there brought into engagement with the second gear wheel 12 of the gearing 9. A centering device 18 on the basic housing 15, together with a corresponding counter-piece on the device 2 to be driven, ensures exact positioning of the gear rack 3 which, in the present exemplary embodiment, is not carried or guided in the overall housing 16, but only in the device 2 to be driven. It is, however, also possible to provide, in the overall housing 16, a counter-bearing on the side of the gear rack 3 that is opposite the second gear wheel 12.

FIG. 2, in a partially sectional and schematic view, shows the action of the drive unit 14 of the linear drive 1 according to the invention in combination with the device 2 to be driven, in an assembled state. The electrical connections 20 attached to the outside of the overall housing 16 only have to have a voltage supply 21 and a connection 22 for a bus system for controlling the drive electronics 19 arranged in the overall housing 16.

FIG. 3 again illustrates the structure and the size ratios of the drive unit 14 in the assembled state. It can be seen that, following the installation of the stepping motor 4, the stator 6 of which has an external diameter D (or, in the case of, for instance, a square cross section, a corresponding cross-sectional width) that is significantly less than the width B or the length L of the approximately square holding plate 8, next to the stepping motor 4 and the gearing 9 sufficient space still remains for the drive electronics 19. The axial length of the stator is preferably approximately twice as great as its diameter, or cross-sectional width. As absolute dimensions in the exemplary embodiment shown, there is a cross-sectional width of, for instance, 26 mm and a stator length of, for instance, 55 mm.

FIG. 4, like FIG. 1, shows the parts that belong to a drive unit according to the invention.

FIG. 5 shows a lateral view of the relatively flat structural form of the entire linear drive 1 not yet illustrated in the preceding figures. It can be seen here that the basic housing 15 is in the shape of a barrel, and has a height H. The drive unit 14 which, as it were, is suspended on the holding plate 8, can be inserted into the barrel-shaped basic housing 15 from above, such that an overall housing 16 is produced and a level joint 23 is formed between the two housing parts 8, 15. The diameter D of the stator 6 of the stepping motor 4 is less than the height H of the overall housing 16 but, owing to a relatively long axial length, the stepping motor 4 in combination with the gearing 9, can nevertheless apply the toques required of such a linear drive 1. FIG. 5 also illustrates the difference in relation to other concepts in the prior art, in which stepping motors are fitted into flat housings. In the case of the present invention, the rotor axle 5 of the stepping motor 4 does not lie in the direction of least extent, namely the height H of the overall housing 16, but perpendicularly thereto. Moreover, the motor is not first fitted into a barrel-shaped housing and brought into engagement with a gear rack before the whole is closed by a cover. In the case of the present invention, a gear rack 3 can be inserted through a lateral opening 17 after the overall housing 16 has been closed. The gear rack 3 is brought into a correct position by a centering means 18. A flange 25 on the overall housing 16 allows the fastening of a device 2 to be driven.

FIG. 6 likewise shows in a lateral, partially sectional view, but from a different direction from that of FIG. 5, a linear drive 1 according to the invention in an assembled state and with an indicated flange-mounted device 2 to be driven, such that the gear rack 3 thereof is in engagement with the second gear wheel 12 of the gearing 9. It becomes evident that the lateral arrangement of the stepping motor 4 not only creates space for drive electronics 19 on the holding plate 8, but also a large amount of space for the movement of the gear rack 3, such that relatively large drive path can be realized. Also evident are the barrel-shaped form of the basic housing 15 and the level joint 23 between the basic housing 15 and the holding plate 8, with an indicated joint sealing 24. The type of the sealing, however, is of secondary importance, and may depend on the ambient and temperature conditions to be dealt with.

FIG. 7, in the same view as in FIG. 6, shows a further exemplary embodiment of the invention, in which the gear rack 3 is provided with a joint 28, preferably a ball joint, and guided by a counter-bearing 27 and pressed against the second gear wheel 12 of the gearing 9. This embodiment facilitates the assembling of the linear drive 1 according to the invention with a device 2 to be driven, and allows certain tolerances in the alignment of these two parts, without limiting the precision of the guiding.

The linear drive according to the invention may be very compact, in particular having dimensions of, for example, a height H of approximately 48 mm, and a length L and a width B each of approximately 120 mm. The linear drive according to the invention is consequently particularly suitable for driving hydraulic valves that are disposed next to each other in a row. The drive is easy to exchange, even on an inner hydraulic valve of a row, and in the case of integrated drive electronics the amount of electrical supply leads can be kept small. However, the linear drive according to the invention can also be used without difficulty for driving other devices, insofar as the latter have their own suitable built-in gear rack.

LIST OF REFERENCES 1 linear drive
2 device to be driven, hydraulic valve
3 gear rack
4 stepping motor
5 rotor axle
6 stator
7 motor output gear wheel
8 holding plate
9 gearing
10 gear shaft
11 first gear wheel
12 second gear wheel
13 bearing arrangement, counter-bearing plate
14 drive unit (in the form of a cover)
15 basic housing (barrel-shaped)
16 overall housing
17 opening
18 centering means
19 drive electronics
20 electrical connections
21 voltage supply
22 connection for bus system
23 joint
24 joint sealing
25 flange
26 flange sealing
27 counter-bearing
28 joint
H height
L length
B width
D diameter of the stator, or cross-sectional width

The invention claimed is:

1. An electric linear drive for a gear rack, comprising:
a stepping motor having a motor output gear wheel;
a holding plate;
a gearing; and
a basic housing,
wherein the holding plate is in a form of a cover to the basic housing,
wherein the stepping motor is fastened to the holding plate and the gearing is fastened to the stepping motor and the holding plate forming a drive unit which, together with the basic housing, forms an overall housing,
wherein the stepping motor has a rotor axle that is arranged parallel to the holding plate and perpendicularly to the gear rack,
wherein the gearing has at least one gear shaft having two gear wheels and a bearing arrangement, wherein the gear shaft is arranged parallel to the rotor axle, wherein a first one of the two gear wheels meshes with the motor output gear wheel, and a second one of the two gear wheels engages with the gear rack, wherein the stepping motor has a stator that has a greatest diameter (D) or cross-sectional width of less than 45 millimeters (mm) and is arranged in a decentralized manner on the holding plate such that drive electronics can be arranged next to the stepping motor, and wherein the overall housing has an opening for inserting the gear rack.

2. The electric linear drive as claimed in claim 1, wherein the drive electronics are integrated into the holding plate such that electrical connections are arranged on an outside of the overall housing.

3. The electric linear drive as claimed in claim 1, wherein the basic housing is configured in a shape of a box, and has a joint extending substantially in one plane, having a joint sealing, to the drive unit comprising the holding plate configured in the form of the cover to the basic housing.

4. The electric linear drive as claimed in claim 3, wherein the basic housing has, as the opening, a lateral opening for inserting the gear rack and a centering means for centering the electric linear drive in relation to the gear rack or a device to be driven by the gear rack.

5. The electric linear drive as claimed in claim 3, wherein the basic housing has a flange, having a flange seal, for attaching a device, which is a hydraulic valve, having the gear rack.

6. The electric linear drive as claimed in claim 1, wherein the overall housing is of a flat configuration having a height (H):length (L):width (B) ratio of approximately 50:130:130.

7. The electric linear drive as claimed in claim 1, wherein the stator has a square cross section with the cross-sectional width of less than 45 mm.

8. A method of mounting the electric linear drive as claimed in claim 1, comprising:
fastening the stepping motor to the holding plate;
fastening the gearing to the stepping motor and the holding plate; and
assembling the drive unit and the basic housing to form the overall housing, such that the stepping motor and the gearing are located within the overall housing.

9. The method as claimed in claim 8, further comprising:
prior to the assembling of the overall housing, fastening the drive electronics to the holding plate such that, following the assembling of the overall housing, electrical connections lie on an outside of the overall housing.

10. The method as claimed in claim 8, further comprising:
following the assembling of the overall housing, connecting the electric linear drive to a device to be driven by the gear rack, in that the gear rack is pushed into the opening of the overall housing, and the device to be driven by the gear rack is connected to the overall housing.

11. The method as claimed in claim 10, further comprising:
connecting a plurality of electric linear drives in succession to a plurality of devices to be driven, respectively, the plurality of electric linear drives having a plurality of overall housings, respectively, the plurality of overall housings having a plurality of openings, respectively, the plurality of electric linear drives being positioned next to each other in a slice-type manner side-by-side such that the plurality of openings point to a plurality of gear racks, respectively.

12. The electric linear drive as claimed in claim 3, wherein the basic housing has a lateral opening for inserting the gear rack and a centering means for centering the electric linear drive in relation to the gear rack.

13. The electric linear drive as claimed in claim 3, wherein the basic housing has, as the opening, a lateral opening for inserting the gear rack and a centering means for centering the electric linear drive in relation to a device to be driven by the gear rack.

14. The method as claimed in claim 8, further comprising:
prior to the assembling of the overall housing, fastening the drive electronics the holding plate such that, following the assembling of the overall housing, electrical connections lie on an outside of the overall housing.

15. The method as claimed in claim 8, further comprising:
prior to the assembling of the overall housing, integrating the drive electronics into the holding plate such that, following the assembling of the overall housing, electrical connections lie on an outside of the overall housing.

16. The electric linear drive as claimed in claim 6, wherein the flat configuration has absolute dimensions of less than 50 mm in height (H), less than 130 mm in length (L) and less than 130 mm in width (B).

* * * * *